United States Patent [19]
Fukada

[11] Patent Number: 5,928,302
[45] Date of Patent: Jul. 27, 1999

[54] STABILITY CONTROL DEVICE OF VEHICLE FOR RELIEVING DRIVE WHEELS FROM SIDE SLIPPING

[75] Inventor: Yoshiki Fukada, Susono, Japan

[73] Assignee: Toyota Jidosha Kabushiki Kaisha, Toyota, Japan

[21] Appl. No.: 08/816,028

[22] Filed: Mar. 11, 1997

[30] Foreign Application Priority Data

Jun. 2, 1996 [JP] Japan .................................... 8-104708

[51] Int. Cl.$^6$ .............................. B60K 28/16; B50T 8/32
[52] U.S. Cl. .............................. 701/70; 701/71; 180/197; 303/146
[58] Field of Search .................................... 701/71, 70, 72, 701/74, 75, 79, 82, 90, 84; 303/140, 155, 163, 165, 166, 167; 180/197

[56] References Cited

U.S. PATENT DOCUMENTS

| | | | |
|---|---|---|---|
| 5,576,959 | 11/1996 | Hrovat et al. | 701/70 |
| 5,627,756 | 5/1997 | Fukada et al. | 180/197 |
| 5,640,324 | 6/1997 | Inagaki | 701/70 |

FOREIGN PATENT DOCUMENTS

| | | |
|---|---|---|
| A-64-85862 | 3/1989 | Japan . |
| A-64-87844 | 3/1989 | Japan . |
| A-2-161146 | 6/1990 | Japan . |

*Primary Examiner*—Tan Q. Nguyen
*Attorney, Agent, or Firm*—Oliff & Berridge, PLC

[57] ABSTRACT

A behavior control device of a vehicle having a means for estimating slip ratio of a pair of left and right drive wheels; a means for estimating lateral force acting at the vehicle body due to its turn running to provide a factor representative of the lateral force; and a means for estimating a target braking force to be generated in one of a pair of front driven wheels serving at the outside of the turn when the vehicle is a rear drive vehicle or one of a pair of rear driven wheels serving at the inside of the turn when the vehicle is a front drive vehicle, based upon the slip ratio and the factor; so that the brake system of the vehicle brakes the front driven wheel serving at the outside of the turn or the rear driven wheel serving at the inside of the turn to generate the target braking force.

10 Claims, 7 Drawing Sheets

DRIVE WHEEL SLIP RATIO Rsa

STABILITY CONTROL DEVICE OF VEHICLE FOR RELIEVING DRIVE WHEELS FROM SIDE SLIPPING

BACKGROUND OF THE INVENTION

1. Field of the Invention

The present invention relates generally to a running behavior control of a vehicle such as an automobile, and more particularly, to a stability control device of a vehicle for relieving drive wheels thereof from side slipping.

2. Description of the Prior Art

It is known in the art of running stability control of vehicles that, when a vehicle driven at the rear wheels runs along a curved course at high speed with engine braking, the vehicle is liable to spin due to a saturation of the tire grip of the rear wheels to the road surface against the centrifugal side force, while when a vehicle driven at the front wheels runs along a curved course at high speed with engine braking, the vehicle is liable to drift out due to a saturation of the tire grip of the front wheels to the road surface against the centrifugal side force, because the lateral grip limit of the tire decreases along with increase of longitudinal slip ratio of the tire due to the limit by the so-called friction circle whose radius corresponds to a vector addition of longitudinal grip force and lateral grip force of the tire. In order to meet with such a problem, it has been proposed in Japanese Patent Laid-open Publication 64-87844 filed by the same assignee as the present application to control the fuel supply system of the engine of a vehicle such that, when a more than certain limited slippage of the driving wheels is detected during an engine braked running of the vehicle, fuel cut is dissolved. According to this prior art, if the engine rotation speed increases beyond a predetermined threshold value when a vehicle is running with its intake throttle valve being fully closed, its fuel supply system is positively cut for the purposes of increasing the effect of the engine braking and reducing the emission of fuel components into the atmosphere. The dissolving of the fuel cut is to dissolve such a positive cutting of the fuel supply system when the vehicle is liable to slip due to a hard engine braking.

In order to further develop such a concept of attenuating the engine braking of a vehicle to retain the vehicle from getting instable by the driving wheels slipping against the road surface due to a hard engine braking, in copending patent application (1150) by the same inventor as in the preset application there has been proposed a device for controlling intake throttle of an engine of a vehicle, said device having a means for estimating an instability quantity representative of turn instability of the vehicle, a means for estimating lateral acceleration of the vehicle, a means for estimating friction coefficient of road surface, a means for estimating a brake limit of a pair of drive wheels based upon the lateral acceleration and the road surface friction coefficient, a means for estimating engine brake torque limit based upon the brake limit of the pair of drive wheels of the vehicle and the instability quantity, a means for estimating a target intake throttle value corresponding to the engine brake torque limit, and a means for attenuating intake throttling of the engine to the target intake throttle value when the intake throttling is tighter than the target intake throttle value, so that the attenuation of engine braking is continuously trimmed to be necessary minimum, so as thereby to avoid any abrupt change of engine braking effect, for further improvement of driving comfortability of the vehicle, while suppressing the total emission of fuel components into the atmosphere as integrated throughout the period of engine braked operation, the trimming of the engine braking attenuation being effected to trace a critical border between the stability and instability of the running behavior of the vehicle all though the driving period of the vehicle.

According to the above-mentioned copending patent application, the execution of the control by the device is restricted by the condition that the actual intake throttling is tighter than the target intake throttle value estimated based upon the instability quantity representative of turning instability of the vehicle, the lateral acceleration acting at the vehicle and the friction coefficient of road surface. In other words, if the actual intake throttling is not tighter than the target intake throttle value so estimated, the device of the invention can not be operated.

SUMMARY OF THE INVENTION

The present invention contemplates to relieve the drive wheels of a vehicle running under engine braking through a curved course from side slipping without such a restriction imposed in the above-mentioned copending patent application, so as to improve the turn stability of the vehicle against spinning when a rear drive vehicle is running through a curved course with engine braking or against drifting out when a front drive vehicle is running through a curved course with engine braking.

In order to accomplish such an object, the present invention proposes a behavior control device of a vehicle having a vehicle body, front left, front right, rear left and rear right wheels supporting the vehicle body, a steering system for steering the front left and front right wheels, a brake system for selectively variably braking each of the front left, front right, rear left and rear right wheels, and a drive system including an engine for selectively variably driving a pair of left and right drive wheels by fuel energy and for selectively variably braking said pair of left and right drive wheels due to air pumping energy consumption, said pair of drive wheels being the rear left and rear right wheels when the vehicle is a rear drive vehicle or the front left and front right wheels when the vehicle is a front drive vehicle, another pair of the front left and front right or the rear left and rear right wheels being a pair of driven wheels, the behavior control device comprising:

a means for estimating slip ratio of the left and right drive wheels;

a means for estimating lateral force acting at the vehicle body due to turn running of the vehicle to provide a factor representative of said lateral force; and a means for estimating a target braking force to be generated in one of the pair of driven wheels based upon said slip ratio and said factor, said one driven wheel serving at the outside of the turn running when the vehicle is a rear drive vehicle or the inside of the turn running when the vehicle is a front drive vehicle;

said brake system being adapted to brake said one driven wheel to generate said target braking force therein.

When such a behavior control device is incorporated in a rear drive vehicle, if the slip ratio of the rear drive wheels increases beyond a threshold value determined therefor when the vehicle is running along a curved course, the front wheel serving at the outside of the turn is automatically braked so as to decelerate the vehicle, thereby reducing the slip ratio of the driving rear wheels, also simultaneously generating a yaw moment in the vehicle for biasing it to turn about the braked front wheel serving at the outside of the turn in a direction opposite to the spinning direction, thereby retaining the vehicle from spinning, while when such a behavior control device is incorporated in a front drive vehicle, if the slip ratio of the front drive wheels increases beyond a threshold value determined therefor when the vehicle is running along a curved course, the rear wheel serving at the inside of the turn is automatically braked so as to decelerate the vehicle, thereby reducing the slip ratio of the driving front wheels, also simultaneously generating a yaw moment in the vehicle for biasing it to turn about the braked rear wheel serving at the inside of the turn in a direction opposite to the drifting out direction, thereby retaining the vehicle from drifting out.

When the vehicle is a rear drive vehicle, the behavior control device according to the present invention may further comprise a means for detecting vehicle speed and a means for detecting yaw rate of the vehicle, and said factor estimation means may be adapted to estimate a value for said factor which is zero when a product of the vehicle speed and the yaw rate is less than a threshold value determined therefor and becomes positive when said product is greater than said threshold value to increase along with increase of said product until a saturation.

When the vehicle is a rear drive vehicle, the behavior control device may further comprise a means for detecting longitudinal acceleration of the vehicle, and said factor estimation means may be adapted to estimate a value for said factor which is zero when the longitudinal acceleration is less than a threshold value determined therefor and becomes positive when said ratio is greater than said threshold value to increase along with increase of said ratio until a saturation.

When the vehicle is a front drive vehicle, the behavior control device may further comprise a means for detecting longitudinal acceleration of the vehicle, and said factor estimation means may be adapted to estimate a value for said factor which is positive and decreases when the longitudinal acceleration is greater than a threshold value determined therefor along with increase of the longitudinal acceleration.

When the vehicle is a rear drive vehicle, the behavior control device may further comprise a means for estimating slip angle of the rear left and rear right wheels, and said factor estimation means may be adapted to estimate a value for said factor which increases along with increase of said slip angle of the rear left and rear right wheels until a saturation when said slip angle of the rear left and rear right wheels increases beyond a threshold value determined therefor.

When the vehicle is a front drive vehicle, the behavior control device may further comprise a means for estimating slip angle of the front left and front right wheels, and said factor estimation means may be adapted to estimate a value for said factor which increases along with increase of said slip angle of the front left and front right wheels until a saturation when said slip angle of the front left and front right wheels increases beyond a threshold value determined therefor.

When the vehicle is a rear drive vehicle, the behavior control device may further comprise a means for estimating slip angle of the front left and front right wheels, and said factor estimation means may be adapted to estimate a value for said factor which decreases along with increase of said slip angle of the front left and front right wheels when said slip angle of the front left and front right wheels increases beyond a threshold value determined therefor.

When the vehicle is a front drive vehicle, the behavior control device may further comprise a means for estimating slip angle of the rear left and rear right wheels, and said factor estimation means may be adapted to estimate a value for said factor which decreases along with increase of said slip angle of the rear left and rear right wheels when said slip angle of the rear left and rear right wheels increases beyond a threshold value determined therefor.

The behavior control device according to the present invention may further comprise a means for detecting yaw rate of the vehicle, a means for detecting steering angle of the steering system, a means for detecting lateral acceleration of the vehicle, a means for detecting longitudinal acceleration of the vehicle, a means for estimating tire deformation of each of the front left, front right, rear left and rear right wheels due to the lateral and longitudinal accelerations, and a means for compensating wheel velocity of each of the front left, front right, rear left and rear right wheels based upon the yaw rate, the steering angle and the tire deformation, and said slip ratio estimation means may be adapted to first estimate wheel velocity of each of the front left, front right, rear left and rear right wheels and then to estimate said slip ratio of the left and right drive wheels as a difference between a mean value of the wheel velocities of the left and right drive wheels and a mean value of the wheel velocities of the left and right driven wheels.

In the behavior control device of the above-mentioned construction, said target braking force estimation means may be adapted to estimate a positive value for said target braking force when said slip ratio is greater than a positive value determined therefor so that a braking is applied to said one driven wheel to relieve the driving wheels from side slipping under a too strong engine braking, and also to estimate a positive value for said target braking force when said slip ratio is smaller than a negative value determined therefor so that a braking is also applied the said one driven wheel to relieve the driving wheel from side slipping under a too strong traction by engine.

BRIEF DESCRIPTION OF THE DRAWINGS

In the accompanying drawings.

DESCRIPTION OF THE PREFERRED EMBODIMENTS

In the following, the present invention will be described in more detail in the form of a preferred embodiment and a modification thereof with reference to the accompanying drawings.

Figure 1:
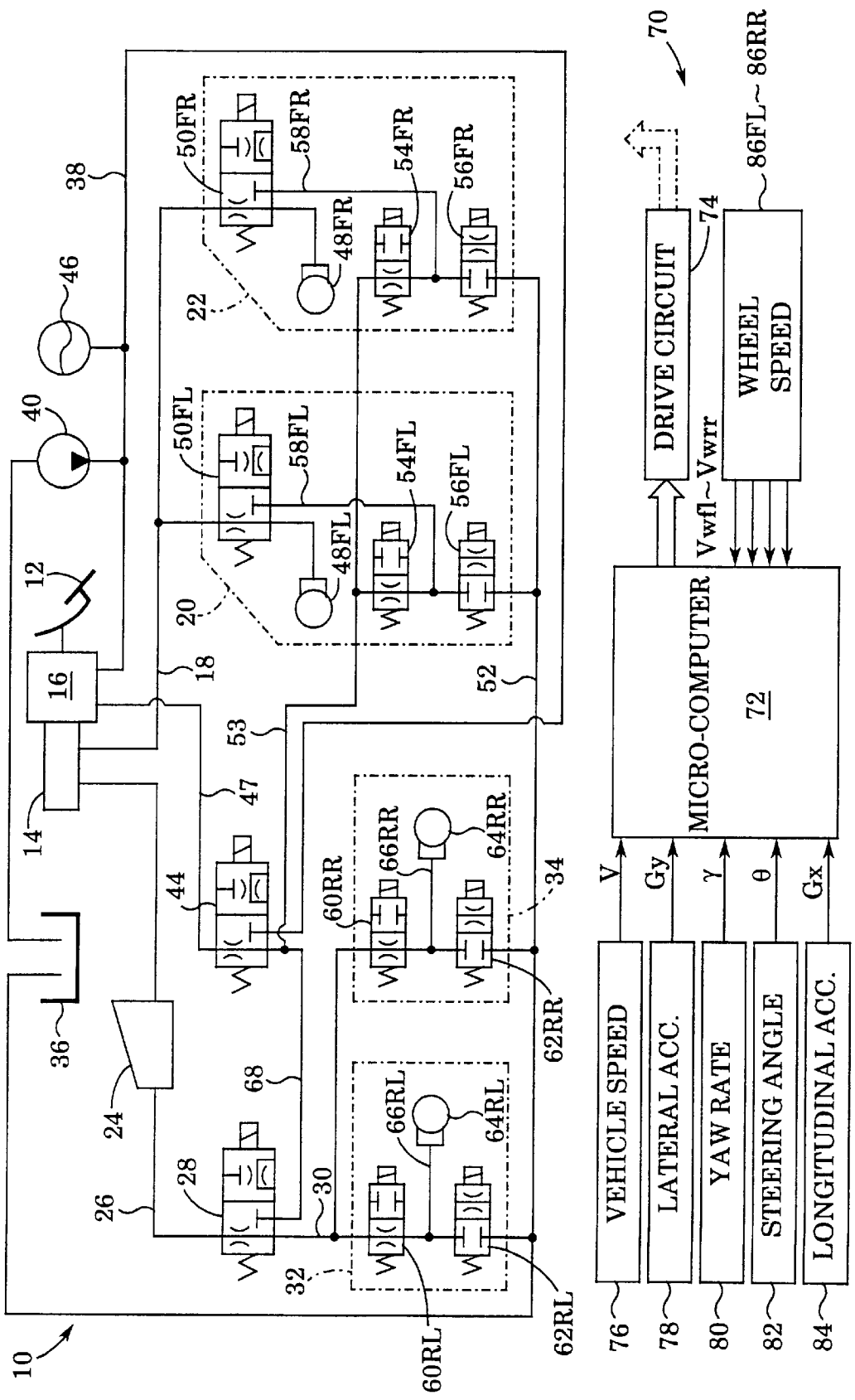
FIG. 1 is a diagrammatic illustration of hydraulic circuit means and electrical control means of an embodiment of the stability control device according to the present invention.

First, referring to FIG. 1 showing diagrammatically an embodiment of the stability control device of the present invention with regard to the constructions of its hydraulic circuit means and its electric control means, the hydraulic circuit means generally designated by 10 comprises a conventional manual brake pressure source means including a brake pedal 12 to be depressed by a driver, a master cylinder 14 adapted to generate a master cylinder pressure according to the depression of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel velocity (wheel circumferential speed) Vwfl, Vwfr, Vwrl, Vwrr of front left and right wheels and rear left and right wheels not shown in the figure from wheel speed sensors 86FL–86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

The read only memory of the micro-computer 72 stores such flowcharts as shown in FIGS. 2, 3, 4 and 11 and such maps as shown in FIGS. 5–10. The central processing unit conducts various calculations based upon the parameters detected by the above-mentioned sensors according to those flowcharts and maps as described hereinbelow, and controls the turn stability of the vehicle by selectively applying a variable braking force to each of the wheels.

Figure 2:
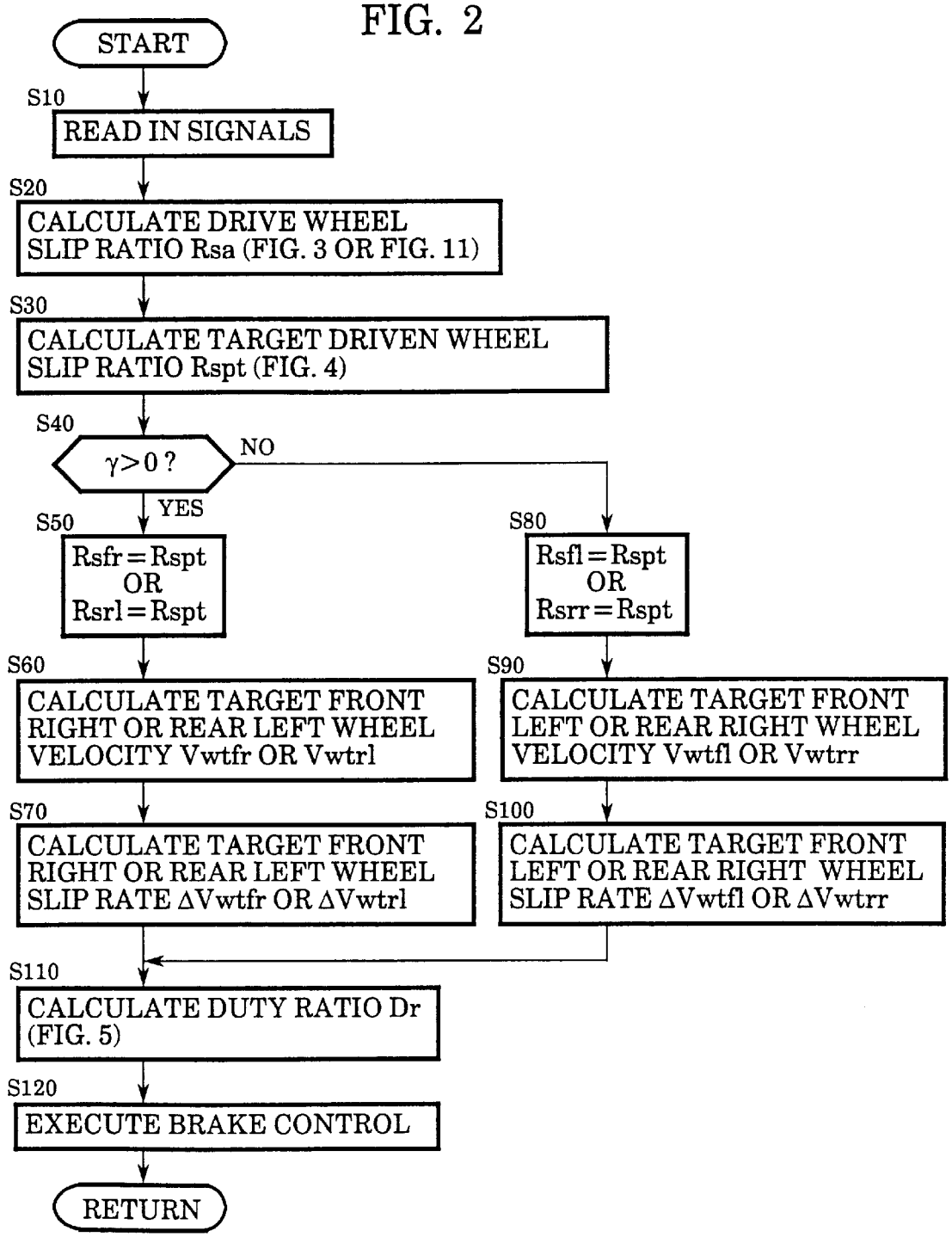
FIG. 2 is a main routine flowchart showing an overall control operation carried out by the device according to the present invention.

FIG. 2 shows an overall operation carried out by the stability control device of the present invention in the form of a flowchart. The control operation according to this flowchart is started with closure of an engine ignition switch not shown in the figure of the vehicle and is cyclically repeated at a cycle time such as tens of microseconds throughout the operation of the vehicle, as well known in the art.

When the device is started, in step 10 signals are read in from the various sensors described above according to a schedule determined by the program incorporated in the device. Then in step 20, drive wheel slip ratio Rsa, i.e. slip ratio of the drive wheels of the vehicle is calculated, as shown in detail in FIG. 3 or 11. When the vehicle is a rear drive vehicle, Rsa is the slip ratio of the rear wheels, while when the vehicle is a front drive vehicle, Rsa is the slip ratio of the front wheels. For a quicker understanding of the overall construction of the invention, the embodiment of FIG. 3 only will be described before proceeding to next step 30 in the main routine.

Figure 3:
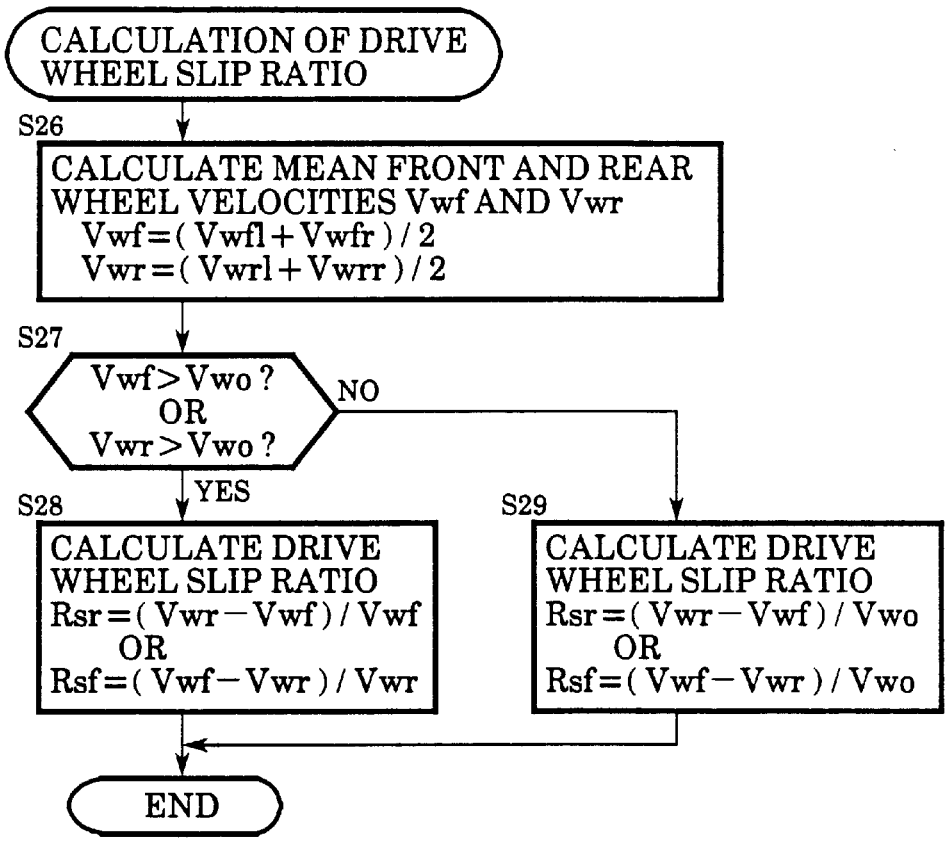
FIG. 3 is a flowchart showing a subroutine conducted in step 20 of the main routine of FIG. 2.

Referring to FIG. 3, in step 26, mean velocities of a pair of front wheels and a pair of rear wheels are calculated respectively as follows:

$$Vwf = (Vwfl + Vwfr)/2$$

$$Vwr = (Vwrl + Vwrr)/2$$

wherein Vw represents wheel velocity perceived as a moving velocity of the wheel on the road surface as viewed from the top of the vehicle, i.e. circumferential velocity of the tire, and suffixes such as f, r, fl, fr, rl and rr refer to front, rear, front left, front right, rear left and rear right, respectively. The same reference to front, rear, front left, front right, rear left and rear right by such suffixes will be made hereinbelow without particular each time notification when it is considered to be obvious, for the brevity of description.

In step 27, it is checked, in case of a rear drive vehicle, if Vwf is larger than Vwo, a value determined as a minimum value of the wheel velocity to stably maintain the control calculation without causing a too large value therein by conducting division by a too small denominator. In case of a front drive vehicle, it is checked if Vwr is larger than Vwo. Then, if the answer is yes, the control proceeds to step 28, and slip ratio Rs of the drive wheels is calculated as follow:

$$Rsr = (Vwr - Vwf)/Vwf \text{ for rear drive vehicle}$$

$$Rsf = (Vwf - Vwr)/Vwr \text{ for front drive vehicle}$$

When the answer of step 27 is no, the control proceeds to step 29, and the slip ratio Rs is calculated as follows:

$$Rsr = (Vwr - Vwf)/Vwo \text{ for rear drive vehicle}$$

$$Rsf = (Vwf - Vwr)/Vwo \text{ for front drive vehicle}$$

Figure 4:
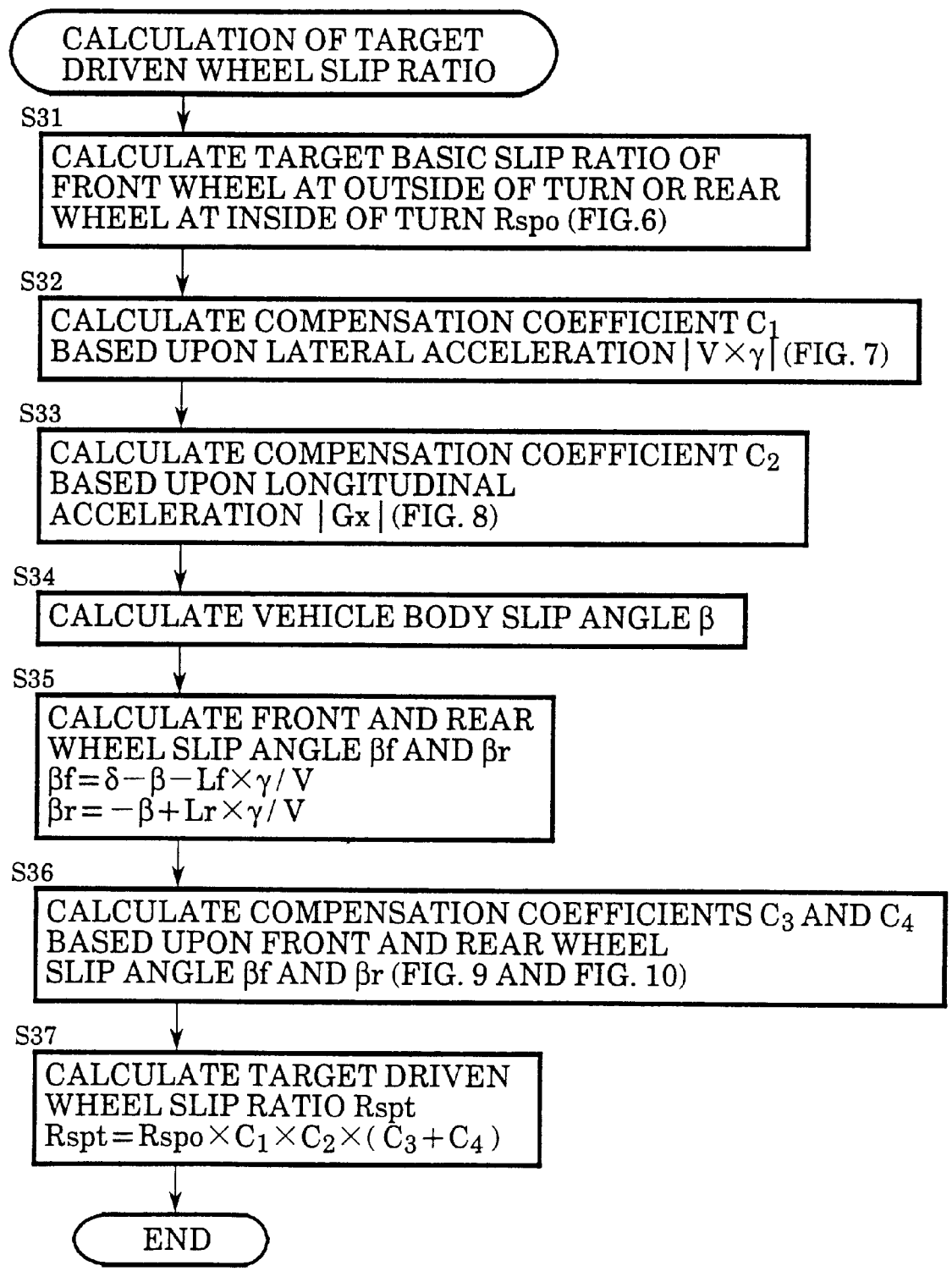
FIG. 4 is a flowchart showing a subroutine conducted in step 30 of the main routine of FIG. 2.

Returning to the main routine of FIG. 2, in step 30, target driven wheel slip ratio Rspt, i.e. slip ratio targeted to be generated in the driven wheels, is calculated according to the subroutine shown in FIG. 4.

Figure 6:
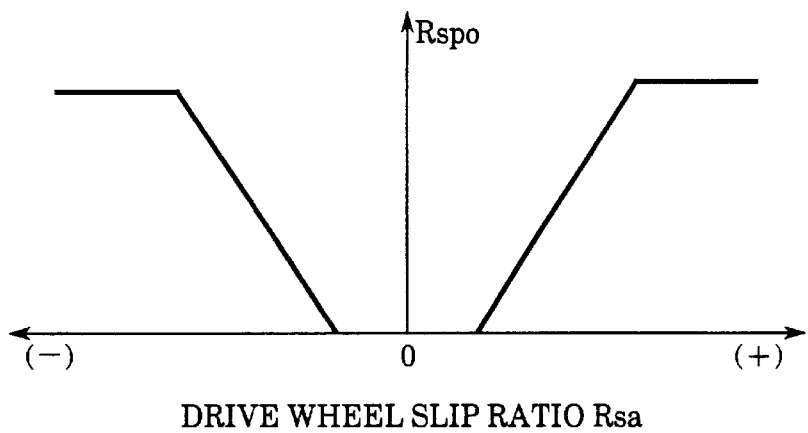
FIG. 6 is a map showing the relationship between drive wheel slip ratio Rsa and target basic slip ratio Rspo of a wheel to be braked.

Referring to FIG. 4, in step 31, a target basic slip ratio Rspo to be generated in the front wheel serving at the outside of a turn running of the vehicle is calculated in case of a rear drive vehicle to generate a yaw moment in the vehicle against spinning of the vehicle due to slippage of the rear drive wheels under an excess engine braking, or a target basic slip ratio Rspo to be generated in the rear wheel serving at the inside of a turn running of the vehicle is calculated in case of a front drive vehicle to generate a yaw moment in the vehicle against drifting out of the vehicle due to slippage of the front drive wheels under an excess engine braking. The value of Rspo may conveniently be read out from a map such as shown in FIG. 6 based upon the value of drive wheel slip ratio Rsa, i.e. Rsr in case of a rear drive vehicle or Rsf in case of a front drive vehicle, obtained in step 28 or 29 of FIG. 3. From FIG. 6, it will be noted that, when the map for Rspo is prepared not only for positive values of Rsa but also for negative values of Rsa, the present control system can also operate to act against too much depression of the accelerator pedal during driving along a curved course so as to automatically actuate the brake of a corresponding wheel to decelerate the vehicle, also simultaneously generating an anti-spin or anti-drift-out yaw moment in the vehicle to retain the vehicle from spinning or drifting out due to side slipping of the too much energized drive wheels.

Figure 7:
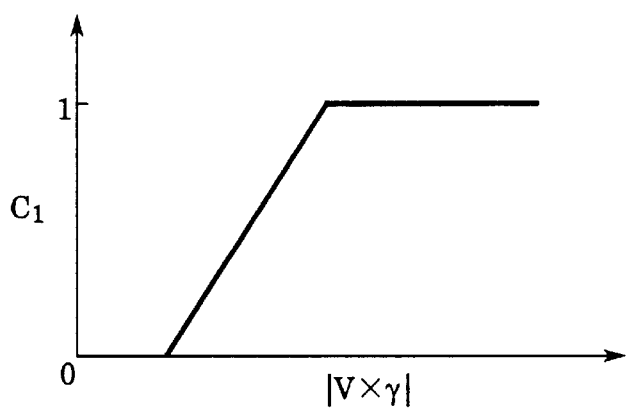
FIG. 7 is a map showing the relationship between the absolute value of $V \times \gamma$, i.e. product of vehicle speed and yaw rate of the vehicle body, and compensation coefficient C1.
Figure 8:
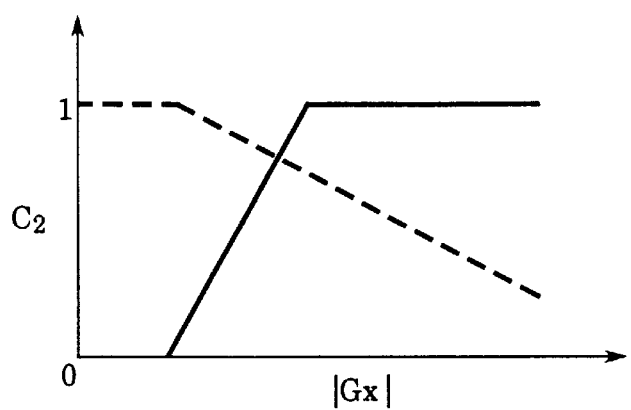
FIG. 8 is a map showing the relationship between the absolute value of vehicle longitudinal acceleration Gx and compensation coefficient C2.

In step 32, a first compensation coefficient C1 is calculated based upon the absolute value of V×γ, i.e. vehicle speed detected by the vehicle speed sensor 76 and the yaw rate sensor 78 of FIG. 1. C1 is multiplied to Rspo as described later in step 37, so as to proportionally modify the slip ratio targeted at a driven wheel for decelerating the vehicle with simultaneous generation of an anti-spin or anti-drift-out yaw moment in the vehicle. The value of C1 may be obtained by referring to a map such as shown in FIG. 7 based upon the absolute value of V×γ. As will be appreciated from FIG. 7, C1 is zero when |V×γ| is relatively small, and then increases along with increase of |V×γ| until it saturates to 1 if |V×γ| further increases, so that the target driven wheel slip ratio Rspt remains zero even when the drive wheel slip ratio Rsa increases, if |V×γ| is small, i.e., if the running course of the vehicle is not substantially curved.

In step 33, a second compensation coefficient C2 is calculated based upon the longitudinal acceleration Gx detected by the longitudinal acceleration sensor 84 of FIG. 1, such that a shifting of the vertical load imposed on the driven wheel due to the longitudinal acceleration applied to the vehicle body is taken into consideration in determining the target slip ratio generated in the braked driven wheel, because if the driven wheel to be braked for the stability control is imposed with a higher vertical load, the wheel may be braked stronger to generate a larger slip ratio before the tire grip thereof to the road surface saturates. Thus, in this step, the coefficient C2 is calculated based upon the absolute value of Gx as expressed by a map of FIG. 8, wherein the curve by solid line is for a front drive vehicle, while the curve by broken line is for a front drive vehicle. The effect available by these performance curves will be self explanatory.

In step 34, vehicle body slip angle β is calculated by a know method such that, first, side slide acceleration Vyd of the vehicle body is calculated as a difference between the lateral acceleration Gy detected by the lateral acceleration sensor 78 of FIG. 1 and a product of the yaw rate γ and vehicle speed V, such as Vyd=Gy−γ×V, then Vyd is integrated on time basis to provide side slide velocity Vy, and then Vy is divided by longitudinal velocity of the vehicle, i.e. vehicle speed V, such as β=Vy/V. (Of course, a measure is incorporated in the calculation program not to execute division by zero denominator, as well known in the art.)

In step 35, based upon the vehicle body slip angle β obtained above and other data such as wheel steering angle δ calculated from θ detected by the steering angle sensor of FIG. 1, yaw rate γ, vehicle speed V, and distances Lf and Lr of front and rear axles from the center of gravity of the vehicle body, respectively, front wheel slip angle βf and rear wheel slip angle βr are calculated as follows:

$$\beta f = \delta - \beta - Lf \times \gamma / V$$

$$\beta r = -\beta - Lr \times \gamma / V$$

Figure 9:
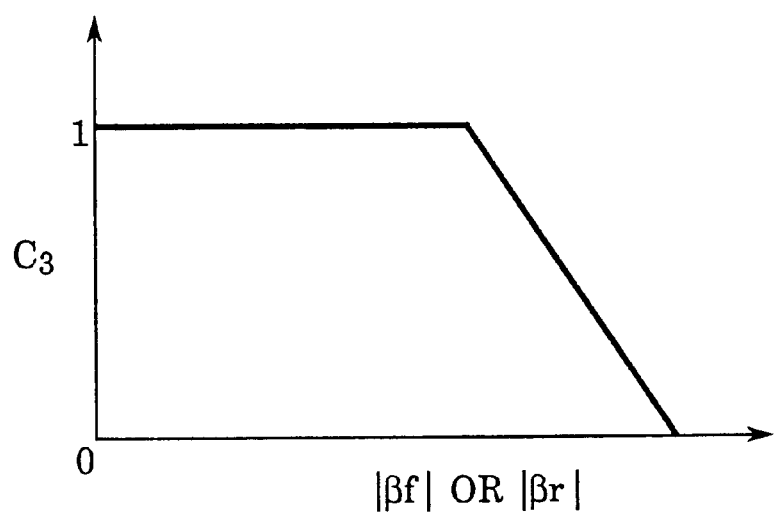
FIG. 9 is a map showing the relationship between the absolute value of front wheel slip angle $\beta f$ and compensation coefficient C3 of a rear drive vehicle or the relationship between the absolute value of rear wheel slip angle $\beta r$ and compensation coefficient C3 of a front drive vehicle.
Figure 10:
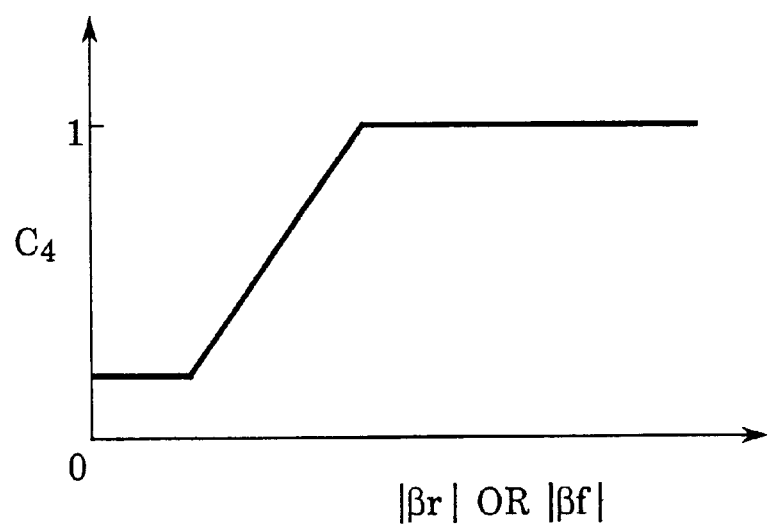
FIG. 10 is a map showing the relationship between the absolute value of rear wheel slip angle βr and compensation coefficient C4 of a rear drive vehicle or the relationship between the absolute value of front wheel slip angle βf and compensation coefficient C4 of a front drive vehicle.

In step 36, by referring to maps such as shown in FIGS. 9 and 10, third and fourth compensation coefficients C3 and C4 are calculated based upon the absolute values of βf and βr, respectively, when the vehicle is a rear drive vehicle, or based upon the absolute values of βr and βf, respectively, when the vehicle is a front drive vehicle. These coefficients are to reflect the slip performance of the front and rear wheels on the stability control of the present invention.

Then, finally in step 37, the target driven wheel slip ratio Rspt is calculated as modified from the target basic slip ratio Rspo read out from the map of FIG. 6, as follows:

$$Rspt = Rspo \times C1 \times C2 \times (C3 + C4)$$

Returning to the main routine of FIG. 2, in step 40, it is checked if the yaw rate γ is positive or not, i.e. if the vehicle is making a left turn or a right turn. When the answer is yes, i.e. if the vehicle is making a left turn, the control proceeds to step 50, and the target driven wheel slip ratio Rspt is set for target slip ratio Rsfr of the front right wheel when the vehicle is a rear drive vehicle to retain the vehicle from spinning in the counter-clockwise direction as viewed from the top of the vehicle, or the target driven wheel slip ratio Rspt is set for target slip ratio Rsrl of the rear left wheel when the vehicle is a front drive vehicle to retain the vehicle from drifting out in the clockwise direction as viewed from the top of the vehicle. When the answer of step 40 is no, i.e. when the vehicle is making a right turn, the control proceeds to step 80, and the target driven wheel slip ratio Rspt is set for target slip ratio Rsfl of the front left wheel when the vehicle is a rear drive vehicle to retain the vehicle from spinning in the clockwise direction as viewed from the top of the vehicle, or the target driven wheel slip ratio Rspt is set for target slip ratio Rsrr of the rear right wheel when the vehicle is a front drive vehicle to retain the vehicle from drifting out in the counter-clockwise direction as viewed from the top of the vehicle.

In step 60, target wheel velocity Vwt of the front right wheel of a rear drive vehicle or target wheel velocity Vwt of the rear left wheel of a front drive vehicle is calculated as follows:

$$Vwtfr = Vwfl \times (100 - Rsfr)/100 \text{ for rear drive vehicle}$$

$$Vwtrl = Vwrr \times (100 - Rsrl)/100 \text{ for front drive vehicle}$$

In step 70, slip rate ΔVw is calculated as a difference between actual wheel velocity of the front right wheel and the target wheel velocity therefor of a rear drive vehicle or a difference between actual wheel velocity of the rear left wheel and the target wheel velocity therefor of a front drive vehicle, with a compensation for longitudinal acceleration, i.e. change rate of wheel velocity and Gx, with an appropriate factor Ks, as follows:

$$\Delta Vwfr = Vwfr - Vwtfr + Ks \times (dVwfr/dt - Gx) \text{ for rear drive vehicle}$$

$$\Delta Vwrl = Vwrl - Vwtrl + Ks \times (dVwrl/dt - Gx) \text{ for front drive vehicle}$$

When the control proceeded to step 80, similar processes are carried out in steps 90 and 100 as in steps 60 and 70 with respect to the front left wheel of a rear drive vehicle or the rear right wheel of a front drive vehicle.

Figure 5:
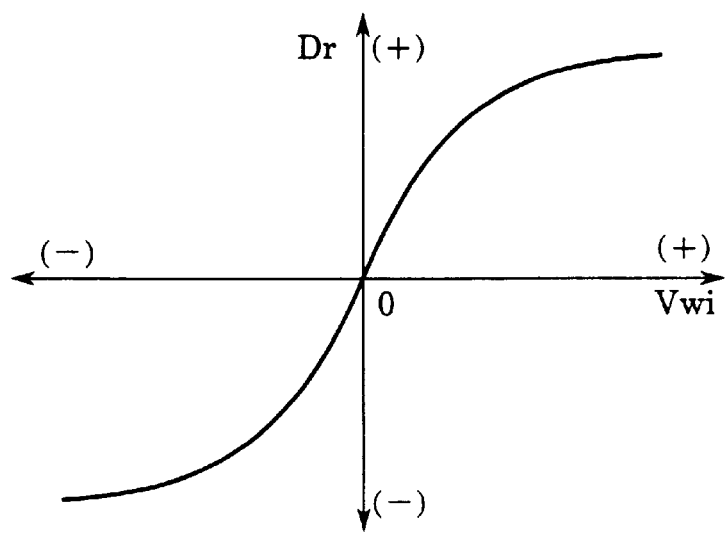
FIG. 5 is a map showing the relationship between target driven wheel slip rate $\Delta Vwi$ and duty ratio Dr of supplying or exhausting hydraulic fluid to or from wheel cylinders of the brake system.

In step 110, duty ratio Dr for operating a corresponding set of on-off valves 54FL–56FL, 54FR–56FR, 60RL–62RL or 60RR–62RR is calculated by reading out a map such as shown in FIG. 5 based upon the value of the slip rate Vw.

In step 120, the brake system shown in FIG. 1 is operated according to the duty ratio Dr thus calculated. When the value of duty ratio Dr is greater than a certain relatively small positive threshold value, the normally open type on-off valve of the corresponding set is opened, with the normally closed type on-off valve of the set being closed to increase the pressure of the corresponding wheel cylinder 48FL, 48FR, 64RL or 64RR, while when the value of duty ratio Dr is smaller than a certain relatively small negative threshold value, the normally closed type on-off valve of the corresponding set is opened, with the normally open type on-off valve of the set being closed, to decrease the pressure of the corresponding wheel cylinder, and when the value of duty ratio Dr is between the positive and negative threshold values, both of the normally open type on-off valve and the normally closed type on-off valve are closed.

Thus it will be appreciated that, by the stability control device of the present invention, when the vehicle is liable to spin due to a slippage of the rear drive wheels of a rear drive vehicle caused by an excessive engine braking (or an excessive engine driving) during a turn running of the vehicle, the front wheel serving at the outside of the turn is appropriately braked to relieve the slip ratio of the rear drive wheels, with simultaneous generation of a yaw moment oriented against spinning, or when the vehicle is liable to drift out due to a slippage of the front drive wheels of a front drive vehicle caused by an excessive engine braking (or an excessive engine driving) during a turn running of the vehicle, the rear wheel serving at the inside of the turn is appropriately braked to relieve the slip ratio of the front drive wheels, with simultaneous generation of a yaw moment oriented against drifting out.

Figure 11:
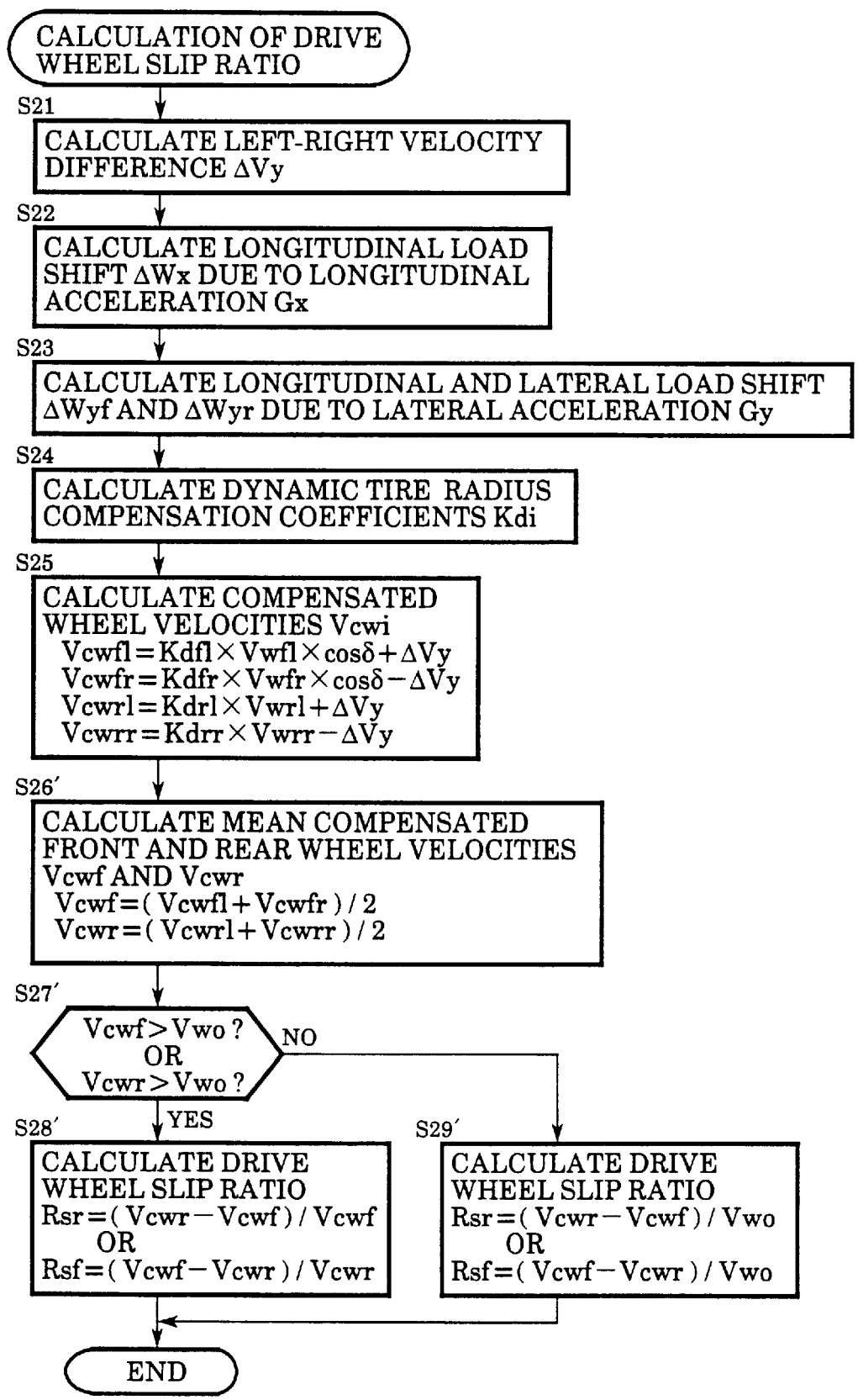
FIG. 11 is a flowchart showing a subroutine of more detailed processing conducted in step 20 of the main routine of FIG. 2.

The calculation of the target drive wheel slip ratio Rsa in step 20 of the main routine may be carried out in more detail as shown in FIG. 11.

Referring to FIG. 11, in step 21, a difference $\Delta Vy$ in the wheel velocity between the leftside and rightside wheels is calculated based upon the yaw rate $\gamma$ and wheel tred T of the vehicle as follows:

$$\Delta Vy = \gamma \times (T/2) \times 3.6 \times \pi / 180$$

In step 22, longitudinal shifting of the share of vertical loading between the front wheels and the rear wheels is calculated as longitudinal load shift $\Delta Wx$, based upon longitudinal acceleration Gx, weight W of the vehicle body, height H of the center of gravity of the vehicle body from road surface, and wheel base L of the vehicle, as follows:

$$\Delta Wx = Gx \times W \times H / L / 2$$

In step 23, longitudinal and lateral shiftings of the share of vertical loading among the front left, front right, rear left and rear right wheels are calculated as lateral load shift $\Delta Wyf$ and $\Delta Wyr$, based upon lateral acceleration Gy, weight W of the vehicle body, height H of the center of gravity of the vehicle body from road surface, wheel tred T of the vehicle, and shares Gpf and Gpr for the front and rear wheels of twisting stiffness of the vehicle body, as follows:

$$\Delta Wyf = (Gy \times W \times H/T) \times Gpf$$

$$\Delta Wyr = (Gy \times W \times H/T) \times Gpr$$

In step 24, dynamic deformation of tire is estimated with respect to each tire as dynamic tire radius compensation coefficient Kdi (i=fl, fr, rl, rr), with tire stiffness St and tire radius Rt, as follows:

$$Kdfl = 1 + \{-\Delta Wx - \Delta Wyf\} \times 9.8 / St / Rt$$

$$Kdfr = 1 + \{-\Delta Wx + \Delta Wyf\} \times 9.8 / St / Rt$$

$$Kdrl = 1 + \{\Delta Wx - \Delta Wyr\} \times 9.8 / St / Rt$$

$$Kdfr = 1 + \{\Delta Wx + \Delta Wyr\} \times 9.8 / St / Rt$$

In step 25, wheel velocities compensated for the tire deformation due to the longitudinal and lateral shifting of load are calculated as compensated wheel velocities Vcwi (i=fl, fr, rl, rr) as follows:

$$Vcwfl = Kdfl \times Vwfl \times \cos\delta + \Delta Vy$$

$$Vcwfr = Kdfr \times Vwfr \times \cos\delta - \Delta Vy$$

$$Vcwrl = Kdrl \times Vwrl + \Delta Vy$$

$$Vcwrr = Kdrr \times Vwrr - \Delta Vy$$

Steps 26', 27', 28' and 29' correspond to and are similar to steps 26, 27, 28 and 29 of FIG. 3, respectively, except that in the more detailed processing of FIG. 11 the wheel velocities are compensated for the tire deformation due to the longitudinal and lateral shifting of load as described above.

In the above descriptions of the embodiment and its partial modification the braking for the stability control was applied to only the front wheel serving at the outside of the turn of a rear drive vehicle for suppressing spinning or the rear wheel serving at the inside of the turn of a front drive vehicle for suppressing drifting out, principally for the purpose of avoiding too much complex of the description. However, as will be appreciated by those skilled in the art, an appropriate auxiliary braking may be applied to the front or rear wheel opposite to the front or rear wheel braked according to the above described embodiment, because such an auxiliary braking is also substantially effective for relieving the braked drive wheel from an excessively slipping condition, although it acts against generating the anti-spin or anti-drift-out yaw moment. Therefore, it is to be understood that the present invention is not limited to applying the braking for stability control exclusively to the front wheel serving at the outside of the turn of a rear drive vehicle or the rear wheel serving at the inside of the turn of a front drive vehicle.

Although the present invention has been described in detail with respect to some particular embodiments thereof, it will be apparent for those skilled in the art that various modifications are possible with respect to the shown embodiments without departing from the spirit of the present invention.

I claim:

1. A behavior control device of a vehicle having a vehicle body, front left, front right, rear left and rear right wheels supporting the vehicle body, a steering system for steering the front left and front right wheels, a brake system for selectively variably braking each of the front left, front right, rear left and rear right wheels, and a drive system including an engine for selectively variably driving a pair of left and right drive wheels by fuel energy and for selectively variably braking said pair of left and right drive wheels due to air pumping energy consumption, said pair of drive wheels being the rear left and rear right wheels when the vehicle is a rear drive vehicle or the front left and front right wheels when the vehicle is a front drive vehicle, another pair of the front left and front right or rear left and rear right wheels being a pair of driven wheels, the behavior control device comprising:

a means for estimating slip ratio of the left and right drive wheels;

a means for estimating lateral force acting at the vehicle body due to turn running of the vehicle to provide a factor representative of said lateral force; and a means for estimating a target braking force to be generated in one of the pair of driven wheels based upon said slip ratio and said factor, said one driven wheel serving at the outside of the turn running when the vehicle is a rear drive vehicle or the inside of the turn running when the vehicle is a front drive vehicle;

said brake system being adapted to brake said one driven wheel to generate said target braking force therein.

2. A behavior control device according to claim 1, wherein the behavior control device further comprises a means for detecting vehicle speed and a means for detecting yaw rate of the vehicle, and said factor estimation means is adapted to estimate a value for said factor which is zero when a product of the vehicle speed and the yaw rate is less than a threshold value determined therefor and becomes positive when said product is greater than said threshold value to increase along with increase of said product until a saturation.

3. A behavior control device according to claim 1, wherein the vehicle is a rear drive vehicle, and the behavior control device further comprises a means for detecting longitudinal acceleration of the vehicle, and said factor estimation means is adapted to estimate a value for said factor which is zero when the longitudinal acceleration is less than a threshold value determined therefor and becomes positive when said ratio is greater than said threshold value to increase along with increase of said ratio until a saturation.

4. A behavior control device according to claim 1, wherein the vehicle is a front drive vehicle, and the behavior control device further comprises a means for detecting longitudinal acceleration of the vehicle, and said factor estimation means is adapted to estimate a value for said factor which is positive and decreases when the longitudinal acceleration is greater than a threshold value determined therefor along with increase of the longitudinal acceleration.

5. A behavior control device according to claim 1, wherein the vehicle is a rear drive vehicle, and the behavior control device further comprises a means for estimating slip angle of the rear left and rear right wheels, and said factor estimation means is adapted to estimate a value for said factor which increases along with increase of said slip angle of the rear left and rear right wheels until a saturation when said slip angle of the rear left and rear right wheels increases beyond a threshold value determined therefor.

6. A behavior control device according to claim 1, wherein the vehicle is a front drive vehicle, and the behavior control device further comprises a means for estimating slip angle of the front left and front right wheels, and said factor estimation means is adapted to estimate a value for said factor which increases along with increase of said slip angle of the front left and front right wheels until a saturation when said slip angle of the front left and front right wheels increases beyond a threshold value determined therefor.

7. A behavior control device according to claim 1, wherein the vehicle is a rear drive vehicle, and the behavior control device further comprises a means for estimating slip angle of the front left and front right wheels, and said factor estimation means is adapted to estimate a value for said factor which decreases along with increase of said slip angle of the front left and front right wheels when said slip angle of the front left and front right wheels increases beyond a threshold value determined therefor.

8. A behavior control device according to claim 1, wherein the vehicle is a front drive vehicle, and the behavior control device further comprises a means for estimating slip angle of the rear left and rear right wheels, and said factor estimation means is adapted to estimate a value for said factor which decreases along with increase of said slip angle of the rear left and rear right wheels when said slip angle of the rear left and rear right wheels increases beyond a threshold value determined therefor.

9. A behavior control device according to claim 1, wherein the behavior control device further comprises a means for detecting yaw rate of the vehicle, a means for detecting steering angle of the steering system, a means for detecting lateral acceleration of the vehicle, a means for detecting longitudinal acceleration of the vehicle, a means for estimating tire deformation of each of the front left, front right, rear left and rear right wheels due to the lateral and longitudinal accelerations, and a means for compensating wheel velocity of each of the front left, front right, rear left and rear right wheels based upon the yaw rate, the steering angle and the tire deformation, and said slip ratio estimation means is adapted to first estimate wheel velocity of each of the front left, front right, rear left and rear right wheels and then to estimate said slip ratio of the left and right drive wheels as a difference between a mean value of the wheel velocities of the left and right drive wheels and a mean value of the wheel velocities of the left and right driven wheels.

10. A behavior control device according to claim 1, wherein said target braking force estimation means is adapted to estimate a positive value for said target braking force when said slip ratio is greater than a positive value determined therefor, and also to estimate a positive value for said target braking force when said slip ratio is smaller than a negative value determined therefor.

* * * * *